(12) United States Patent
Radyk

(10) Patent No.: US 10,246,134 B1
(45) Date of Patent: Apr. 2, 2019

(54) TRUCK MUD FLAP WITH ELBOW TUBES

(71) Applicant: Nicholas Radyk, Bluefield, VA (US)

(72) Inventor: Nicholas Radyk, Bluefield, VA (US)

( * ) Notice: Subject to any disclaimer, the term of this patent is extended or adjusted under 35 U.S.C. 154(b) by 0 days.

(21) Appl. No.: 16/027,294

(22) Filed: Jul. 4, 2018

Related U.S. Application Data

(60) Provisional application No. 62/674,849, filed on May 22, 2018.

(51) Int. Cl.
*B62D 25/18* (2006.01)

(52) U.S. Cl.
CPC .................................. *B62D 25/18* (2013.01)

(58) Field of Classification Search
CPC ...... B62D 25/18; B62D 25/16; B62D 25/161; B62D 25/168; B62D 25/182; B62D 25/186; B62D 25/188
See application file for complete search history.

(56) References Cited

U.S. PATENT DOCUMENTS

| | | | | |
|---|---|---|---|---|
| 3,350,114 A | * | 10/1967 | Salisbury | B62D 25/18 280/851 |
| 3,743,343 A | * | 7/1973 | Grote, Sr. | B62D 25/16 280/851 |
| 3,869,617 A | * | 3/1975 | Gaussoin | B62D 25/188 280/851 |
| 5,199,742 A | * | 4/1993 | Gotz | B62D 25/18 280/851 |
| 5,273,318 A | * | 12/1993 | Nakayama | B62D 25/188 280/851 |
| 5,375,882 A | * | 12/1994 | Koch, III | B62D 25/188 280/848 |
| 5,564,750 A | * | 10/1996 | Bajorek | B62D 25/188 280/848 |
| 6,554,306 B1 | * | 4/2003 | Gaspar | B62D 25/18 280/159 |
| 6,719,328 B2 | * | 4/2004 | Szakurski | B62D 25/16 280/848 |
| 6,786,512 B2 | * | 9/2004 | Morin | B62D 25/188 280/847 |

(Continued)

*Primary Examiner* — James M Dolak
(74) *Attorney, Agent, or Firm* — Dinsmore & Shohl LLP; Monika L'Orsa Jaensson, Esq.

(57) ABSTRACT

A mud flap adapted to be attached behind a wheel or outside a wheel of a vehicle, particularly useful in association with large trucks or tractor trailers, which facilitates the redirected flow of water, mud, snow and roadway debris to and down the exterior surface of the mud flap. The mud flap is adapted to be attached to a vehicle behind a wheel thereof, using conventional technology, and includes a panel defined by an interior surface intended to be positioned approximal a tire and an opposing exterior surface. The panel has a plurality of annular apertures extending through the panel. A plurality of elbow tubes extend from the exterior surface of the panel at each of the apertures, and a plurality of lip structures defined by an arced perimeter, extend from the interior surface of the panel. The elbow tubes of the disclosed technology include a body extending with a downward curvature relative to the panel when the panel is attached to the vehicle. In this configuration, water, snow, ice and roadway debris flow down the interior surface of the panel, are collected by the lips and redirected through the elbow tubes, down the exterior surface of the panel.

19 Claims, 3 Drawing Sheets

(56) References Cited

U.S. PATENT DOCUMENTS

| | | | | |
|---|---|---|---|---|
| 6,799,782 B2 * | 10/2004 | Jain | ...................... | B62D 25/161 |
| | | | | 280/847 |
| 6,851,717 B1 * | 2/2005 | Andersen | ............... | B62D 25/18 |
| | | | | 280/847 |
| 7,625,013 B2 * | 12/2009 | Kellick | ................. | B62D 25/18 |
| | | | | 280/847 |
| 8,608,203 B2 * | 12/2013 | Downes | ................. | B62D 25/18 |
| | | | | 280/848 |
| RE44,755 E * | 2/2014 | Surti | ................... | B62D 25/188 |
| | | | | 280/847 |
| 8,919,818 B2 * | 12/2014 | Kim | ................... | B60R 13/0861 |
| | | | | 280/847 |
| 2013/0161935 A1 * | 6/2013 | Ward | ................... | B62D 25/182 |
| | | | | 280/851 |

* cited by examiner

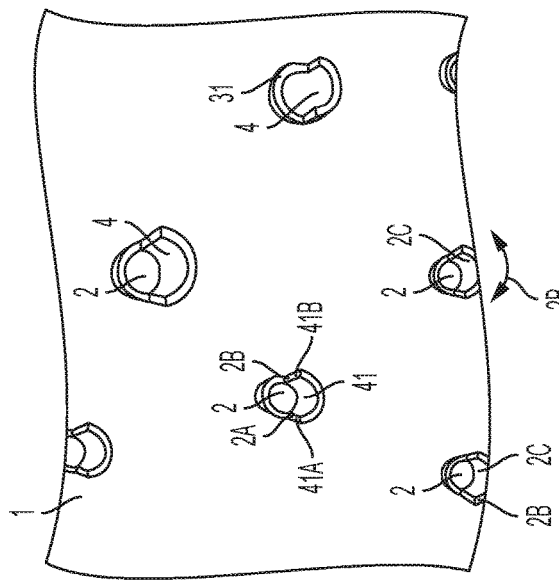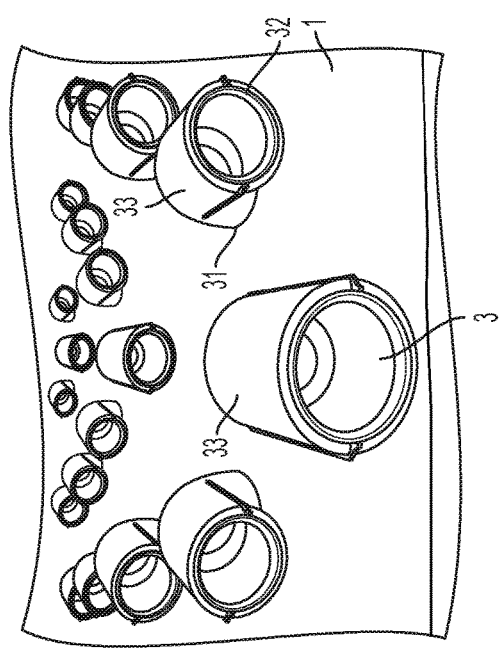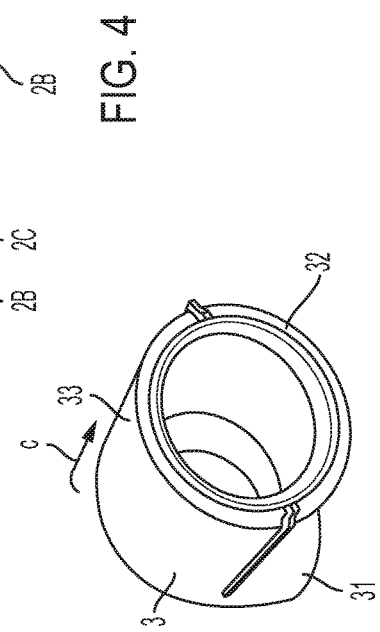

TRUCK MUD FLAP WITH ELBOW TUBES

FIELD OF THE INVENTION

The disclosed technology relates generally to mud flaps adapted for use on wheeled vehicles. More particularly, the disclosed technology relates to a novel mud flap that is adapted to redirect water, snow, ice and roadway debris from the interior surface of the flap (nearest the tire) to an opposing exterior surface of the flap.

BACKGROUND

Presently, large trucks use mud flaps or mud guards to protect persons and property from flying debris picked up by a rotating tire. Typically, these mud flaps are substantially rectangular in shape and have a solid deflecting panel. The top edge of a typical mud flap is mounted behind a wheel of a vehicle such that the bottom of the mud flap hangs freely near the roadway surface. However, the mud flaps presently on the market do not deflect all of the spraying mud, debris, snow and water to the ground, and a large portion of the water and other roadway debris encountered by a conventional mud flap continues to be projected into the path of other vehicles and pedestrians.

It would be desirable, therefore, if a mud flap could be provided which reduces the amount of water and other road debris projected off the interior surface of the mud flap, and instead captures and redirects it into a stream down the exterior surface of the flap.

Accordingly, it is an advantage of the disclosed technology claimed herein to provide a mud flap which captures water, snow, ice, mud and roadway debris collected on the interior surface of the mud flap, and redirects and channels the same into a stream down the exterior surface of the mud flap. Additional advantages of this technology will become apparent from an examination of the drawings and the ensuing description.

GENERAL DESCRIPTION OF THE DISCLOSED TECHNOLOGY

The disclosed technology is directed to a mud flap adapted to be attached behind a wheel or outside a wheel of a vehicle, particularly useful in association with tires of large trucks or tractor trailers, which facilitates the redirected flow of water, mud, snow, ice and roadway debris to and down the exterior surface of the mud flap. The disclosed technology may also be appropriately sized for use on pickup trucks, buses, and automobiles or sport utility vehicles.

The mud flap of the disclosed technology is adapted to be attached to a vehicle behind a wheel thereof, using conventional technology. This novel mud flap includes a panel defined by an interior surface intended to be positioned approximal a tire, and an opposing exterior surface. The panel has a plurality of annular apertures extending through the panel, with each aperture defined in part by a lower semicircular perimeter. A plurality of elbow tubes extend from the exterior surface of the panel at each of the apertures, and a plurality of lip structures defined by an arced perimeter, extend from the interior surface of the panel at the lower semicircular perimeter of a corresponding aperture. The elbow tubes of the disclosed technology include a body extending with a downward curvature relative to the panel when the panel is attached to the vehicle. In this configuration, water, snow, ice, mud and roadway debris flow down the interior surface of the panel, are collected by the lips and redirected through the elbow tubes, down the exterior surface of the panel.

In order to facilitate an understanding of the disclosed technology, the preferred embodiments of the technology are illustrated in the drawings, and a detailed description thereof follows. It is not intended, however, that the disclosed technology be limited to the particular embodiments described or to use in connection with the apparatus illustrated herein. Various modifications and alternative embodiments such as would ordinarily occur to one skilled in the art to which the disclosed technology relates are also contemplated and included within the scope of the disclosed technology described and claimed herein.

BRIEF DESCRIPTION OF THE DRAWINGS

An embodiment of the disclosed technology is illustrated in the accompanying drawings, in which like reference numerals represent like parts throughout, and in which:

FIG. 3 is an enlarged view of a portion of the exterior face of the embodiment of the disclosed technology illustrated in FIG. 1;

FIG. 4 is an enlarged view of a portion of the interior face of the embodiment of the disclosed technology illustrated in FIG. 2;

FIG. 5 is an enlarged view of a portion of an elbow tube of the disclosed technology.

DETAILED DESCRIPTION OF THE DISCLOSED TECHNOLOGY

Figure 1:
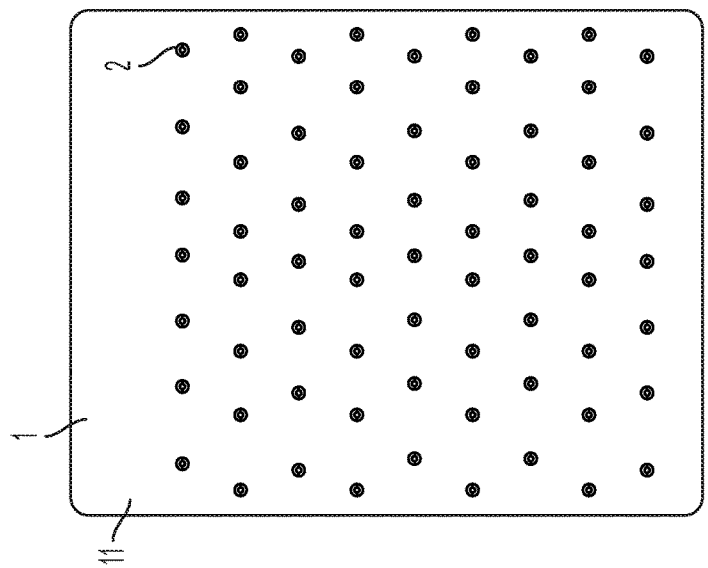
FIG. 1 is a view of the exterior face of an embodiment of the disclosed technology.

Referring now to the drawings, an embodiment of the mud flap of the disclosed technology is illustrated by FIGS. 1-4, wherein the mud flap includes a rectangular panel 1 made from a flexible, durable material (i.e., rubber, polypropylene, or some other elastomeric or polymeric material) having a plurality of apertures 2 extending therethrough, with a plurality of elbow tubes 3 extending from the apertures on the exterior surface of the mud flap and a plurality of lip structures 4 extending from the apertures on the interior surface of the mud flaps.

Figure 6:
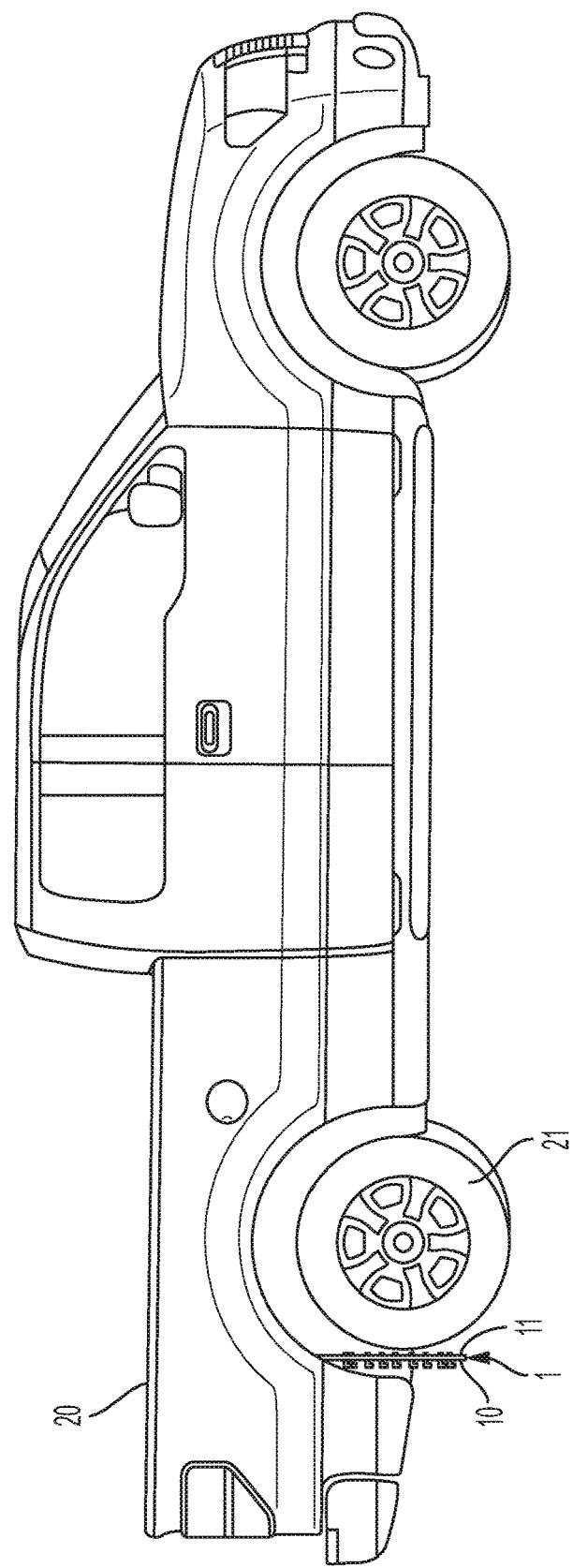
FIG. 6 is a view of an embodiment of the disclosed technology as provided on a vehicle.

The panel 1 is defined by an interior surface 11 (shown in FIGS. 2 and 4) and intended to be positioned approximal a (see FIG. 6), tire 21 of a vehicle 2, and an opposing exterior surface (shown in FIGS. 1 and 3). Each aperture 2 extending through the panel may be defined by an upper semicircular perimeter and a lower semicircular perimeter 2B, to form an annular aperture. In the embodiment shown, the apertures are aligned in a series of adjacent horizontal rows across the panel, where the apertures of each row are vertically offset from the apertures of the adjacent horizontal rows.

As shown in FIG. 5, the elbow tubes 3, such as annular ninety-degree elbow tubes, are affixed to and extend from the exterior surface IQ of the panel (see FIGS. 1 and 3). A first end 31 of each tube is positioned at and extends from the aperture, with the curvature C of the body 33 of the tube extending downward relative to the panel when the panel is attached to the vehicle, terminating in a second end 32. In this configuration, water, snow, ice and roadway debris flow or pass through the apertures and the tubes, down the exterior surface of the panel. Although described as ninety-degree elbow tubes, elbow tubes with a slightly less angular structure would be suitable for use with the disclosed technology.

The elbow tubes may be affixed to the exterior surface of the panel, extend through and affix to the walls of the panel apertures, or be formed integral with the panel. In some embodiments, the elbow tubes are affixed by adhesives to the panel; in other embodiments it is contemplated that the panel and the elbow tubes are molded together as an assembly. When affixed to the exterior surface of the panel, the interior cross-sectional area of the apertures may be shaped and sized the same as the interior cross sectional area of the first end of the tubes so that the aperture and interior area of the tubes are aligned, and facilitate ease of flow of solid particulate and fluids through the apparatus. Alternatively, the cross sectional area of the apertures may be slightly larger than the exterior cross-sectional area of the elbow tubes to accommodate the tubes in the apertures in a fitting arrangement. Furthermore, to avoid any obstructions within the tubes the cross sectional area of the tubes through their length may be consistent, or may increase from the first end to the second end.

Figure 2:
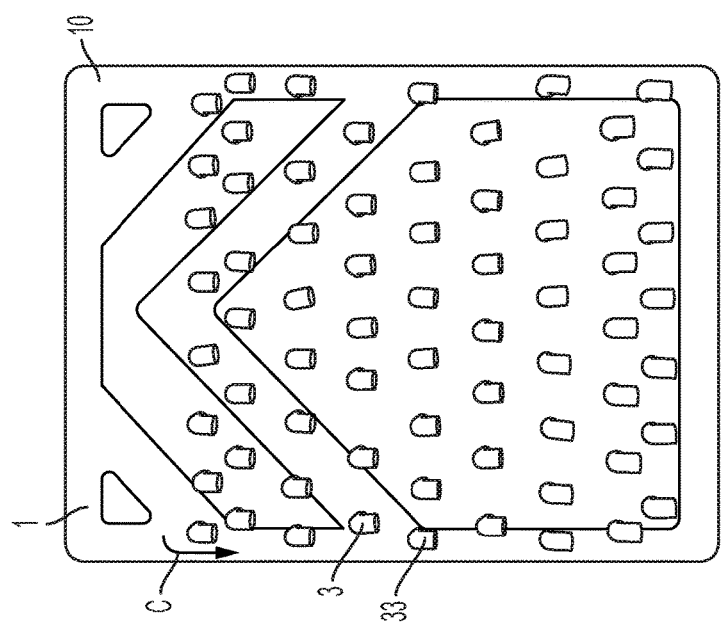
FIG. 2 is a view of the interior face of the embodiment of the disclosed technology illustrated in FIG. 1.

The plurality of lip structures 4 extending from the interior surface of the panel are defined by an arced perimeter, protruding outward (e.g., relatively perpendicular) from the interior surface of the panel at the lower semicircular perimeter 2B of each aperture (see, e.g., FIGS. 2 and 4). The lips may be independent elements and structure affixed to the interior surface of the panel, may be formed as an extension of the first end of the elbow tubes if the elbow tubes are received within the apertures of the panel as hereinabove described, or may be molded with the panel. The top surface 41 of the lip structures have a concave curvature equal to and coextensive with either the curvature of the panel aperture or the curvature of the interior of the first end of the elbow tube. In this configuration, the lip structure extends the lower portion of the interior surface 2C of the aperture or tube. The curvature of the lip may extend no more than half of the perimeter of the aperture or tube, from the lip's first end 41A to its second end 41B and the depth of the lip may extend between 1/8" and 1/4" from the interior side of the panel. In the embodiment shown, the lip has a consistent depth extending from the interior side of the panel, however it is contemplated that this depth may vary from the ends of the lip to its center. If constructed as a separate element from the tube, the lips may be designed and configured to extend into the aperture of the panel. As shown in the Figures, the lips protrude perpendicularly from the interior surface of the panel; however, they may protrude at a slight angle upward relative to the interior surface of the panel when affixed to a vehicle.

The novel mud flap of the disclosed technology may be formed in a single mold, or the elbow tubes and/or lips may be formed separate and affixed to the apertures of the panel, wherein the tubes and the lips are positioned on and secured to the panel surfaces or within the panel apertures in multiple configurations by means of glues or adhesives, suitable to secure the tubes and lips to the panel.

By this configuration, and when the mud flap of the disclosed technology is affixed to a vehicle, behind the tire, water, silt, mud and small debris may be deflected by the tire onto the interior surface of the flap, and as gravity pulls the same down it is collected by the lips on the interior surface of the flap. By the shape and configuration of the elbow tubes, the water, silt, mud and debris collected by the lips is decelerated and routed to the exterior of the flap, where it is vertically discharged down the exterior surface of the flap.

The mud flap of the disclosed technology is attached to a vehicle by means of conventional technology, such as threaded fasteners and rivets, for example. In operation, the embodiments of the panel of the disclosed technology demonstrate the numerous advantages thereof, including reducing the amount of water, ice, snow, mud and other road debris that is projected off the interior surface of the mud flap, and instead redirects the potentially hazardous solid and liquid into a slower velocity stream, down the exterior surface of the flap.

Finally, the simplicity of the design and method of manufacture of the mud flap demonstrates the advantages of the mud flap claimed herein over existing mud flaps. The mud flap of the disclosed technology may be manufactured inexpensively using current molding technology, and is inexpensive to replace, repair and maintain.

Although this description contains many specifics, these should not be construed as limiting the scope of the invention but as merely providing illustrations of some of the embodiments thereof, as well as the best mode contemplated by the inventor of carrying out the disclosed technology. The disclosed technology is susceptible to various modifications and adaptations, and the same are intended to be comprehended within the meaning and range of equivalents of the appended claims.

What is claimed is:

1. A mud flap for use on vehicles behind a tire thereof, the mud flap comprising:
   a panel defined by an interior surface and an opposing exterior surface, the panel having a plurality of annular apertures extending through the panel, each aperture defined in part by a lower semicircular perimeter;
   a plurality of elbow tubes extending from the exterior surface of the panel, at each of the apertures, each of the tubes having a body extending with a downward curvature relative to the panel; and
   a plurality of lip structures defined by an arced perimeter, each of the lip structures extending from the interior surface of the panel, at the lower semicircular perimeter of one of the apertures.

2. The mud flap of claim 1, wherein the apertures are aligned in a series of adjacent horizontal rows across the panel, the apertures of each row being vertically offset from the apertures of the adjacent horizontal rows.

3. The mud flap of claim 1, wherein the elbow tubes are annular, ninety degree elbow tubes.

4. The mud flap of claim 3, wherein the tubes have the same cross-sectional area along the length thereof.

5. The mud flap of claim 1, wherein a first end of each of the elbow tubes is affixed to the exterior surface of the panel, at the corresponding aperture of the panel.

6. The mud flap of claim 1, wherein a first end of each of the elbow tubes is positioned within the corresponding aperture of the panel.

7. The mud flap of claim 6, wherein a cross-sectional area of the apertures is slightly larger than an exterior cross-sectional area of the first end of elbow tubes, to receive the same in fitting arrangement.

8. The mud flap of claim 1, wherein the panel and the elbow tubes are formed together as an assembly.

9. The mud flap of claim 1, wherein a cross-sectional area of each of the apertures is equal to an interior cross sectional area of a first end of the corresponding elbow tube.

10. The mud flap of claim 1, wherein the lip is formed as an extension of the first end of the elbow tube.

11. The mud flap of claim 1, wherein the lip is formed with the panel as an assembly.

12. The mud flap of claim 1, wherein a top surface of the lip is coextensive with an interior surface of the aperture.

13. The mud flap of claim 1, wherein an arced top surface of the lip is coextensive with a lower interior surface of a first end of the tube.

14. The mud flap of claim 1, wherein opposing ends of the lip extend no more than the lower semi-circular perimeter of the corresponding aperture.

15. The mud flap of claim 1, wherein the lip extends perpendicularly from the interior panel surface between $\frac{1}{8}"$ and $\frac{1}{4}"$ from the interior surface of the panel.

16. The mud flap of claim 1, wherein the elbow tubes and the lips are secured to the panel by means of an adhesive.

17. The mud flap of claim 1, wherein the panel, the elbow tubes and the lips are formed in a single mold.

18. The mud flap of claim 1, wherein the lips are formed as an extension of a first end of the elbow tubes, and wherein the first end of the elbow tubes are positioned within the corresponding apertures of the panel.

19. The mud flap of claim 18, wherein opposing ends of the lips extend no more than a lower semi-circular perimeter of the first end of the elbow tubes.

* * * * *